United States Patent [19]

Fallon, Jr. et al.

[11] 4,180,128
[45] Dec. 25, 1979

[54] MULTIPLE FURNACE WASTE HEAT RECOVERY SYSTEM

[75] Inventors: John J. Fallon, Jr., 1330 Sugarloaf Dr., Pasadena, Calif. 91103; Joe B. Blair, Huntington Beach, Calif.; Donald R. Phelps, Glendale, Calif.; Robert P. Cabeen, III, Pasadena, Calif.

[73] Assignees: John J. Fallon, Jr.; Donald Ritt, both of Sun Valley, Calif.

[21] Appl. No.: 869,459

[22] Filed: Jan. 16, 1978

Related U.S. Application Data

[62] Division of Ser. No. 641,721, Dec. 18, 1975, Pat. No. 4,083,398.

[51] Int. Cl.² .................................. F28D 15/00
[52] U.S. Cl. .................................... 165/76; 126/117; 165/103; 165/107; 165/138; 165/DIG. 12; 432/180
[58] Field of Search ........................... 34/86; 126/117; 122/504.2, 510, DIG. 2; 165/66, 76, 103, 107, 138, 151, DIG. 2, DIG. 12; 236/91 R; 237/2 A, 55; 432/179, 180, 223

[56] References Cited

U.S. PATENT DOCUMENTS

| | | | |
|---|---|---|---|
| 2,385,161 | 9/1945 | Pinkerton | 122/504.2 |
| 2,699,758 | 1/1955 | Dalin | 165/66 |
| 2,948,516 | 8/1960 | Martinelli et al. | 165/107 |
| 3,581,986 | 6/1971 | Magri | 236/91 R |
| 3,602,294 | 8/1971 | Wanson | 165/11 |
| 3,712,597 | 1/1973 | Waitkus et al. | 432/180 |
| 3,780,799 | 12/1973 | Pasternak | 165/151 |
| 3,905,126 | 9/1975 | Villalobos et al. | 165/DIG. 12 |
| 3,944,136 | 3/1976 | Huie | 237/55 |
| 4,015,932 | 4/1977 | Zurawski | 432/179 |
| 4,137,965 | 2/1979 | Fallon, Jr. et al. | 165/DIG. 12 |

FOREIGN PATENT DOCUMENTS

2410391 9/1975 Fed. Rep. of Germany ............. 165/66
530320 12/1940 United Kingdom .
536521 5/1941 United Kingdom .
719510 12/1954 United Kingdom .

Primary Examiner—Sheldon Jay Richter
Attorney, Agent, or Firm—Blakely, Sokoloff, Taylor & Zafman

[57] ABSTRACT

A system for recovering the waste heat normally exhausted into the atmosphere by chemical or other processing plants. The invented system comprises a substantially self-contained apparatus for receiving hot exhaust gases and extracting the waste heat therefrom for some beneficial use, such as pre-heating inlet air in an inlet plenum. The system may include temperature and pressure controls which enhance the safety and efficiency of the system's operation, and further may include flow controls in a multiple burner installation so that the desired fuel air ratios and heat distribution may be achieved. By building the present invention as a substantially self-contained and self-supporting assembly, on site installation time and the required alteration of pre-existing on site equipment may be minimized, thereby affecting substantial economic savings by minimizing the resulting down time of the processing plant. Embodiments for a single burner nest heater, multiple nest cabins and grade level stack systems are disclosed.

24 Claims, 5 Drawing Figures

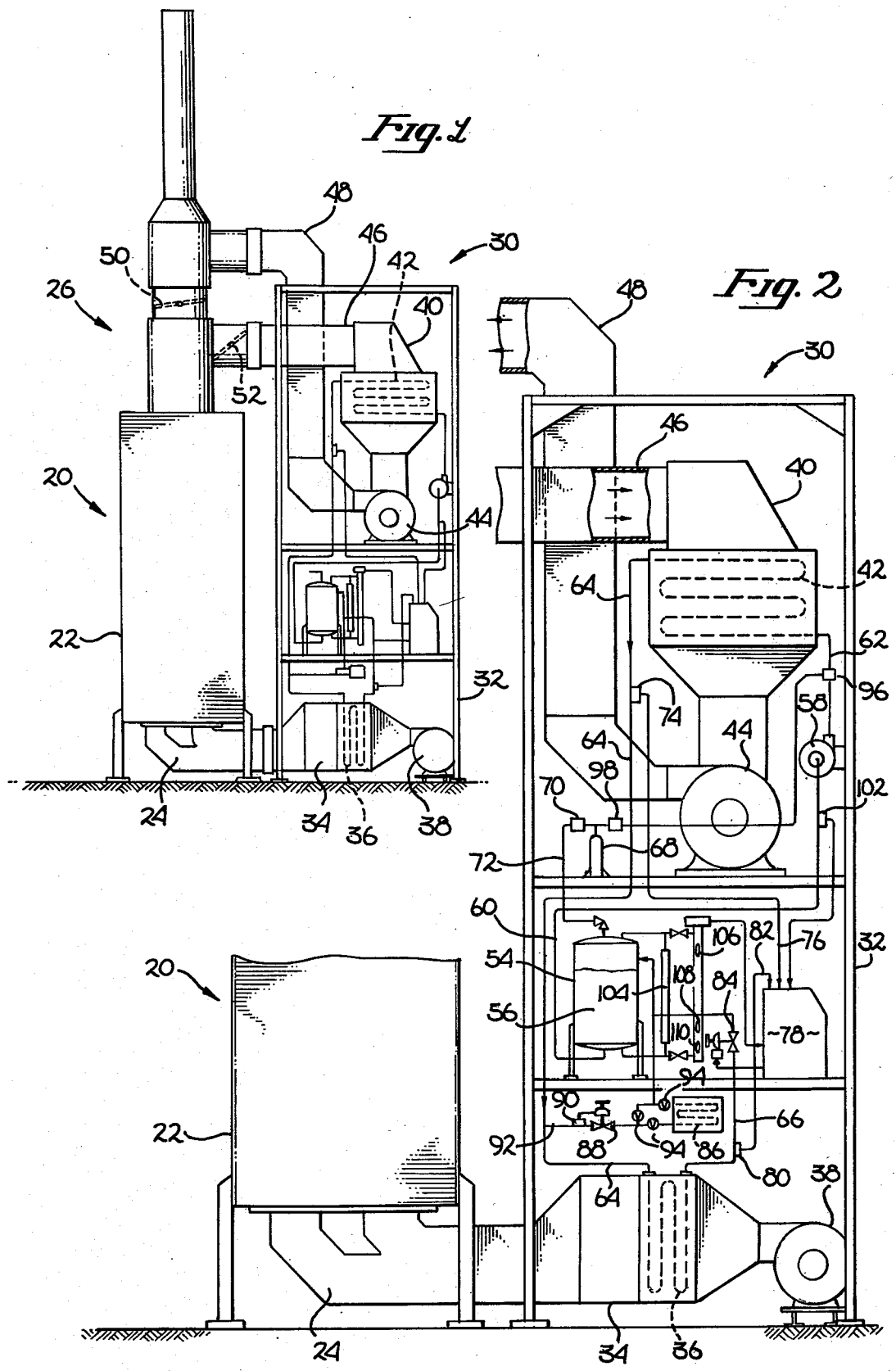

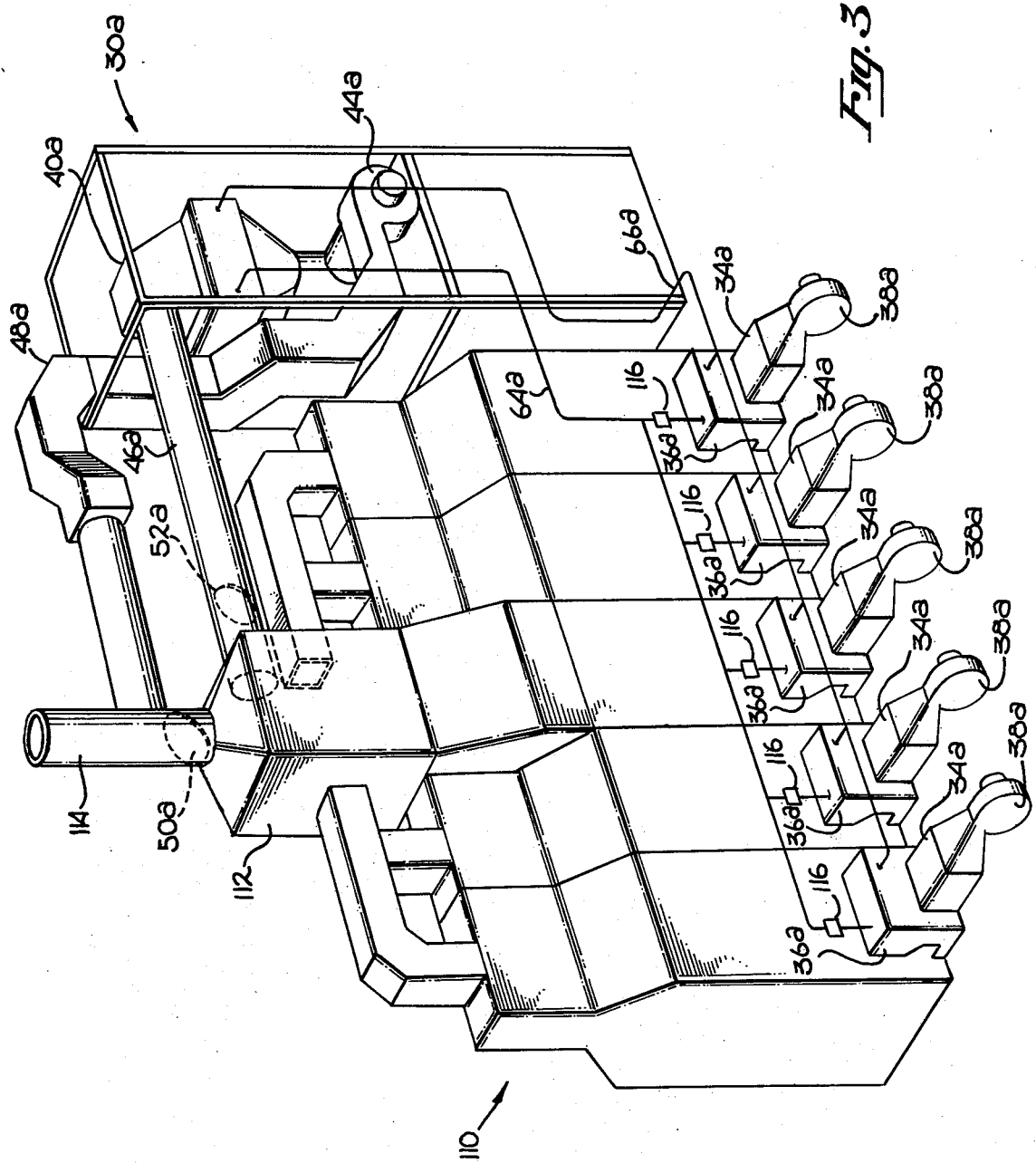

MULTIPLE FURNACE WASTE HEAT RECOVERY SYSTEM

This is a divisional of our co-pending application, entitled "Improved Waste Heat Recovery System", Ser. No. 641,721, Dec. 18, 1975, now U.S. Pat. No. 4,083,398.

BACKGROUND OF THE INVENTION

1. Field of the Invention

This invention relates to the field of waste heat recovery systems, and more particularly to waste heat recovery systems for recovering waste heat contained in exhaust gases for subsequent beneficial use, such as the pre-heating inlet air in an inlet plenum.

2. Prior Art

A substantial quantity of heat energy is generated as a by-product of many chemical and industrial processes. In many cases, this heat is exhausted into the atmosphere through exhaust stacks and flues because the cost of its recovery has been greater than could be economically justified. This heat is known in the field as "waste heat" because it is, in fact, all too often wasted energy. Perhaps, twenty (20) years ago and earlier, an industrial society could afford to waste energy on a massive scale because the cost of one million BTU's of energy was only about 8 cents. Today, however, the cost of one million BTU's of energy is about $2.00. Thus, there exists today a great economic incentive to recover the waste heat of chemical and industrial processes and to use it beneficially in the process; e.g., to preheat the inlet combustion air.

Waste heat recovery systems are known to the prior art. However, the systems of the prior art have one or more significant shortcomings and limitations. One waste heat recovery system well known and commonly used in the prior art utilizes the so-called Ljungstrom heat exchanger. The Ljungstrom heat exchanger is a regenerative heat exchanger in that it includes a regenerator drum rotatably mounted in a housing divided into separate compartments through which the hot exhaust gases and the cool gases to be heated flow. The drum, driven by an electric motor, has a capacity for heat absorption and release. As the drum rotates, it absorbs waste heat from the hot exhaust gases in one compartment and gives up the heat to the cooler gases in the other compartment.

The Ljungstrom heat exchanger imposes several severe limitations upon any waste heat recovery system in which it is utilized. In the first place, the regenerator drum must be relatively large in order for sufficient waste heat to be recovered. The large drum, in turn, requires the use of large exhaust and inlet compartments and associated ducts, the latter often 6 feet or larger in diameter. Secondly, by virtue of the use of a drum as the basic heat exchange medium, the two compartments of the housing must be located adjacent to one another. Thus, if the gases heated by the drum are to be used at a location remote from the location of the source of the waste heat gases, ducting must be provided between the exchanger and such remote point. Further, a blower of sufficient capacity must also be provided in order to force the heated gases to flow to the remote point of utilization. Thus, such regenerator drum systems suffer from the disadvantages of higher cost (due to the ducting and blower capacity required) and from the fact that they require relatively large installations which, together with the associated ducting, tie up much valuable property in a non-productive manner. For the foregoing reasons, a waste heat recovery system utilizing a Ljungstrom heat exchanger may prove to be economically unfeasible in some applications. In addition, such systems are typically more difficult to install than systems which use a fluid heat transfer medium, such as the present invention. In the latter case, 4 inch pipes are typically used in lieu of 6 foot or larger ducts. Another disadvantage of waste heat recovery systems which employ a Ljungstrom heat exchanger is that they are limited to transferring waste heat from hot exhaust gases to cooler combustion air.

Heat exchange apparatuses and methods are known in the prior art. Such apparatuses are generally used to transfer "process heat", as distinguished from waste heat, from one point in the process to another. Many such heat exchangers utilize a liquid heat transfer medium. However, the temperature and other conditions present in a waste heat recovery application are typically far more severe than those encountered in applications wherein process heat is being transferred. Thus, a reliable and economical waste heat recovery system cannot be constructed by simply utilizing the heat exchanger apparatuses and methods of the prior art, suitable for the transfer to process heat, to solve a waste heat recovery problem.

U.S. Pat. No. 3,623,549, issued to Horace L. Smith, is an example of a prior art heat exchanger utilizing a plurality of heat transfer liquids. Smith's invention transfers heat from a gas at one location to a cooler gas at a second location which may be considerably removed from the first location. Smith discloses the use of at least two independent flow circuits through which different heat transfer liquids flow. Each flow circuit comprises a pair of interconnected finned tube type heat exchangers. The first heat exchanger of each circuit is located in a duct through which the hot gas flows, while the second is located in a duct through which the cool gas flows.

While U.S. Pat. No. 3,623,549 teaches the use of a suitable heat transfer liquid in closed flow circuits for the transfer of heat from one point to a second remote point, it applies such teachings to a general and relatively simple application of hot and cool gases flowing in two separate ducts. Smith's invention does not address itself to the particular conditions typically found in waste heat recovery applications where, for example, the temperatures and pressures at various points are critical parameters which must be controlled. To illustrate this point, the following two temperature constraints on waste heat recovery systems are cited: (i) the temperature of the heat transfer liquid must not reach a level which could damage the pumping means typically used in the flow circuit; (ii) the temperature of the exhaust gases must not be permitted to drop to a temperature at which some of the gases may begin to condense onto the heat exchanger located in the exhaust stack, because such condensation would cause corrosion of the exchanger. If condensation of the exhaust gases is not prevented or substantially mitigated, the heat exchanger in the stack would have to be replaced periodically, thereby causing expense and down time in the operation of the process. Thus, the teachings of Smith are inadequate for the waste heat recovery applications for which the present invention is advantageously suited.

There have been attempts in the prior art to apply heat exchange apparatuses, utilizing a fluid as a heat transfer medium, for the recovery and transfer of waste heat. U.S. Pat. No. 2,699,758 issued to David Dalin, is an example of one such attempt. Dalin discloses an apparatus for improving combustion in the furnaces of steam boilers by preheating the combustion air, in two stages, to a relatively high temperature by using the flue gases as a source of heat for this purpose. He teaches the use of water as a first heat transfer medium in a first stage of waste heat recovery and superheated steam as the medium of heat transfer in the second stage thereof.

Unlike Smith, Dalin discloses the uses of some temperature and pressure control means; e.g., (i) an economizer 19 to insure a definite temperature differential between the two zones of the flue passage at which the heat exchangers draw their heat; (ii) a thermostatically controlled valve 34 which controls flow through a bypass pipe 33; and (iii) a thermally response control element 35 which controls the opening of the valve 34. However, the invention of Dalin suffers from one of the major shortcomings of the prior art at the time of its invention (circa 1950); namely, the unavailability of heat transfer liquids suitable for the high temperatures encountered in waste heat recovery applications. Many of the heat transfer liquids of the prior art flash off at the high temperatures typically encountered in an exhaust stack, thereby creating a fire hazard; others tend to corrode the piping means through which they flow. While water and steam, as heat transfer mediums, do not flash off or cause as much corrosion as other liquids, they have their own disadvantages. Water, since it boils at 100C., is inherently limited with respect to the amount of heat it can absorb without changing phase. On the other hand, steam, especially superheated steam, introduces the obvious disadvantages of high pressure; for example, severe design requirements with respect to the structural strength of the heat exchange apparatus and associated piping, and (ii) maintenance problems with respect to the detection and repair of leaks.

Still another disadvantage of the Dalin system, attributable to its use of superheated steam as the heat transfer medium, is the limitation that the latter imposes with respect to the distance between the flue passage (or exhaust stack) and the place to which the waste heat is to be delivered. If the distance is great enough, the continuing loss of heat through the conducting pipes may cause the superheated steam to condense to water. As a result of the heat transfer medium being in two phases within the flow circuit (i.e., steam and condensed water), its flow becomes non-uniform and difficult to regulate. If the flow of the heat transfer medium cannot be readily regulated, the control of critical temperatures within the system becomes more difficult, if not impossible.

U.S. Pat. Nos. 3,405,509 and 3,405,769 disclose means for recovering waste heat in the exhaust stack of fired oil field equipment. The invention disclosed in U.S. Pat. No. 3,405,509 is limited in that it uses, as the heat transfer medium, the very oil well product fluids, (e.g., a mix of oil and water) which are being processed. U.S. Pat. No. 3,405,759 likewise teaches the use of the process liquid as the heat transfer medium. However, the latter patent also teaches the use of a separate heat transfer fluid contained in a source separate from the process fluids; in the latter connection, however, the patent teaches the use of water and steam as the separate heat transfer fluid, both of which have the disadvantages and limitations described above with reference to U.S. Pat. No. 2,699,758 (Dalin).

Most recently a system has been introduced which utilizes a first heat exchanger in the stack or flue, a second heat exchanger at the waste heat utilization site, such as by way of example the inlet air plenum to a set of burners, with a suitable liquid heat transfer medium carrying the waste heat therebetween. This system with its associated control apparatus provided for efficient waste heat recovery. However, installation of such systems could be time consuming, and the down time cost while the system was being installed could be on the same order as the cost of the waste heat recovery system, or higher. Aside from the fact that the first heat exchanger was actually mounted in the stack or flue, thereby requiring substantial cutting, welding and plumbing while the system is shut down, many furnace systems, particularly those fabricated since the second world war, do not have adequate structure in the stack or flue to support the heat exchanger and associated hardware, and accordingly the entire stack has to be reinforced from ground level to provide adequate structure for the required load. This is time consuming, and can lead to excessive down time, making the cost of the waste heat recovery system excessive and deterring the more immediate application of such system.

BRIEF SUMMARY OF THE INVENTION

A system for recovering the waste heat normally exhausted into the atmosphere by chemical or other processing plants. The invented system comprises a substantially self-contained apparatus for coupling to an exhaust stack and an inlet air plenum for furnaces so as to extract the waste heat from the exhaust gas for delivery to the inlet air. The system may include temperature and pressure controls which enhance the safety and efficiency of the system's operation, and further may include flow control in a multiple burner installation so that the desired fuel air ratios and heat distribution may be achieved. While the primary control is generally determined by a low temperature limit for the exhaust gas below which condensation may occur, over-temperature and other controls are also provided. By building the present invention as a substantially self-contained and self-supporting assembly, on site installation time and the required alteration and reinforcing of pre-existing on site equipment may be minimized, thereby affecting substantially economic savings by minimizing the resulting down time of the processing plant for installation. Embodiments for a single burner nest heater, multiple nest cabins and grade level stack systems, as well as a specific embodiment of heat exchanger for use in the systems of the present invention, are disclosed.

BRIEF DESCRIPTION OF THE DRAWINGS

FIG. 1 is a schematic illustration of a vertical stack furnace system incorporating one embodiment of the present invention.

FIG. 2 is an illustration of the system of FIG. 1 taken on an expanded scale.

FIG. 3 is a perspective view of an alternate embodiment coupled to a cabin having multiple burner nests therein.

DETAILED DESCRIPTION OF THE INVENTION

Figure 4:
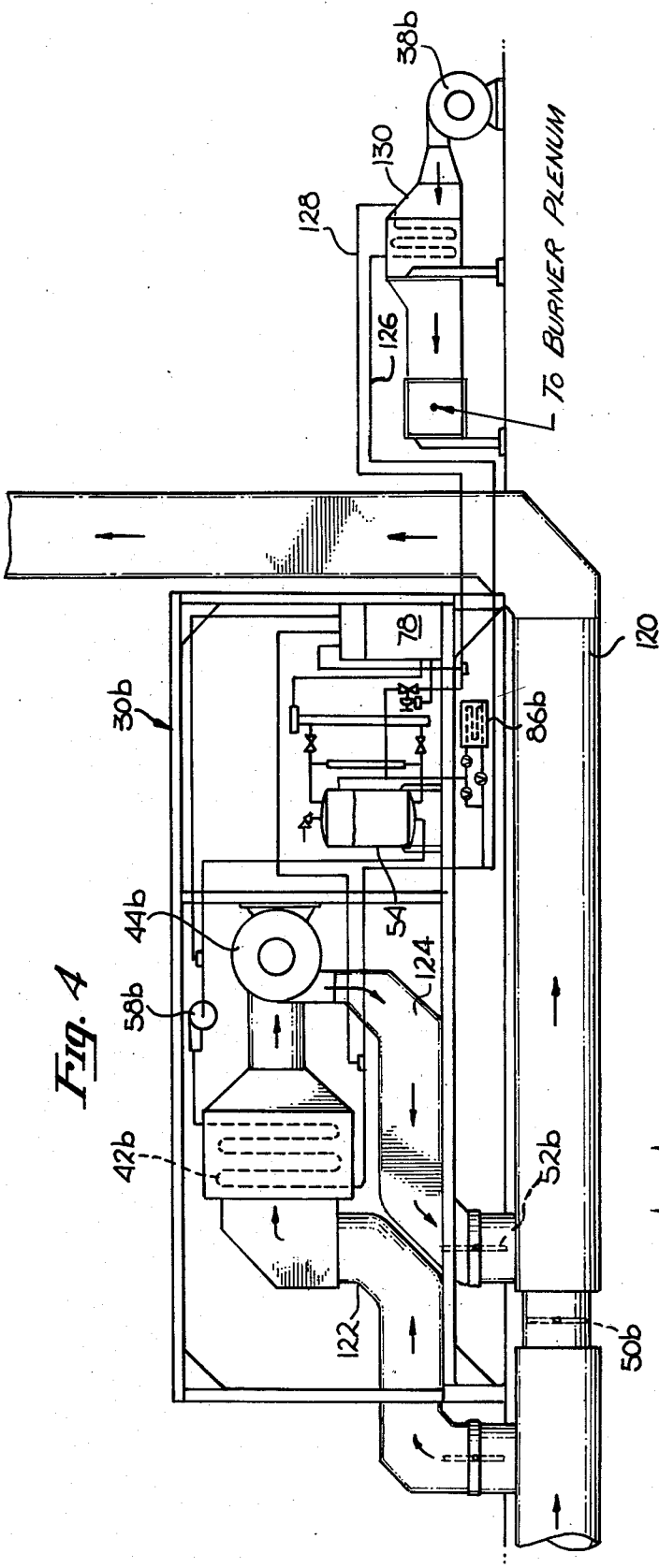
FIG. 4 is a still further alternate embodiment for use with grade level exhaust stack systems.

The present invention comprises a waste heat recovery system which provides for the efficient and well controlled recovery of exhaust gas heat for such purposes as preheating air in an air inlet plenum of one or more burner assemblies. Three embodiments are actually disclosed and described in detail herein, each employing the general principles of the present invention, but each directed to one of the three more commonly encountered furnace and exhaust configurations. In particular, the first embodiment described is for a conventional furnace having an inlet air plenum and a single vertical exhaust stack coupled to the top of the furnace. The second embodiment is for a cabin having a bank of burner nests, with the inlet plenum being comprised of separate plenums for each nest, and the third configuration is for use in conjunction with ground level exhaust systems.

One key aspect to the present invention is its modular construction which minimizes the extent of on site construction and alteration that is required, thereby minimizing the down time required for installation. By use of the modular construction, the waste heat recovery system of the present invention is generally self-supporting so that only ducting, dampers and other relatively light-weight apparatus need be coupled to the exhaust stack, thereby generally eliminating the need to provide increased reinforcing for the entire stack. While major servicing of a furnace installation may require a down time of approximately six weeks, routine periodic maintenance normally has a turn around time on the order of two weeks. To the extent that the on site installation time required to install the present invention system may be minimized, installation may be achieved during a routine periodic maintenance without substantial increase in the down time required, thereby effecting overall savings even though the fabrication cost of certain component assemblies may be somewhat increased.

Now referring to FIG. 1, one embodiment of the present invention as it would be coupled to a typical furnace or heater of the prior art may be seen. The furnace with which this embodiment is utilized, generally indicated by the numeral 20, is comprised of a furnace chamber 22 having an air inlet plenum 24 coupled to burners within the furnace (not shown), with a single vertical exhaust stack generally indicated by the numeral 26. Typically the inlet air plenum 24 will be provided with a blower at the inlet thereof to force air past the burners at the desired velocity.

The present invention comprises the self-standing structure 30 and apparatus contained therein to provide a waste heat recovery system which may be readily coupled to existing furnace installations, as shown in FIG. 1. The key components of the waste heat recovery system 30 visible in FIG. 1, aside from its frame assembly 32, are an inlet air duct 34 containing a heat exchanger 36, with a fan 38 providing the required inlet air velocity past the heat exchanger 36 into the inlet air plenum 24, and an exhaust air duct 40 containing a heat exchanger 42 and blower 44. The exhaust air duct 40 with heat exchanger 42 is coupled through a first duct 46 to the stack 26 for directing the hot exhaust gases from the stack into the duct 40 and past the heat exchanger 42. A second exhaust gas duct 48 redirects the cooled exhaust gas delivered from blower 44 back to the stack 26, typically at an elevation above the elevation of the inlet duct 46 for subsequent flow directly out through the remaining stack structure. Preferably, a damper 50 is provided in the stack between the connections of ducts 46 and 48 to controllably block the flow of exhaust gas in this region, with a second damper 52 providing a control of the exhaust gas flow through the apparatus of the present invention. Thus with damper 50 closed and damper 52 open, the normal exhaust gas flow from the furnace will be diverted by damper 50 through duct 46, past the heat exchanger 42, and back into the exhaust stack 26 at a position above damper 50 through duct 48 for subsequent disposal through the furnace stack structure. On the other hand, should cleaning or other servicing of the apparatus of the present invention be required at times when the furnace system is otherwise preferably not to be shut down, damper 52 may be closed and damper 50 opened to temporarily operate the furnace structure in the prior art manner. Further the control of these dampers provides a convenient way of preventing an excess temperature rise in the heat exchanger 42, as the approachment of an excessive temperature in the duct 46 for the heat exchanger 42 may be used to close damper 52 and open damper 50. For this purpose a single excess temperature detection point might be used to provide an ON/OFF type control for the two dampers or if desired, a proportional control of the dampers could be used (in most instances in normal operation of the system of the present invention, damper 52 will be in the maximum OPEN position and damper 50 will be in the maximum CLOSED position).

Now referring to FIG. 2 the structure 30 of FIG. 1 may be seen on an expanded scale. In addition to those elements hereinbefore identified with respect to FIG. 1, there is provided a heat transfer fluid flow circuit and associated supply and control apparatus to provide efficient and well controlled operation of the system. A reservoir 54 provides a supply of heat transfer fluid 56 which may be pumped by pump 58 through lines 60 and 62 into the first heat exchanger 42, and therefrom through lines 64 to the second heat exchanger 36, with a return to the reservoir 54 being provided by line 66. Accordingly in operation the heat transfer fluid 56 in the reservoir circulates first through pump 58, then the heat exchanger in the exhaust gas flow stream, then to the heat exchanger in the inlet air duct and finally back to the reservoir. Thus, the temperature of the fluid in the reservoir will generally be approximately the same as the temperature of the fluid on the outlet side of the heat exchanger 36, with the outlet side of heat exchanger 42 in line 64 representing the hottest portion of the heat transfer fluid circuit. These temperature extremes may be quite severe depending upon the apparatus and the environment in which it is used, and accordingly system controls are provided to maintain the operating conditions within acceptable bounds consistent with material limitations for the heat exchanger materials and the heat transfer fluid. In that regard, heat transfer liquids capable of operating at extreme temperatures, ranging from as low as −80° F. up to as high as 900° F. are known. Such liquids include O-dichlorobenzene, diphenyl-diphenyloxide eutectic, di-aryl ethers and tri-aryl ethers sold by Dow Chemical Company under the trademark "Dowtherm" and hydrogenated terphenyls, and polychlorinated biphenyl and polyphenyl ether sold by the Monsanto Company under the trademark "Therminol". Other suitable heat transfer liquids are alkyl-aromatic petroleum oil, sold by Socony Mobil Oil Co. under the mark "Mobiltherm"; alaphatic petroleum oil sold by Exxon under the mark "Humbletherm"; and a good grade, pure lubricating oil. Any of these products would be suitable for most applications in which the present invention has utility. These preferred heat transfer liquids do not become too viscous for controllable flow at the low temperatures nor do they tend to flash at the high temperatures. In order to avoid leakage of air into the system through any possible leak which could develop, and to overcome the vapor pressure of the heat transfer fluids, particularly at the higher temperature and lower pressure regions of the flow circuit, it is preferable to pressurize the system so that the lowest pressure encountered by the heat transfer fluid is at least higher than atmospheric, and more preferably on the order of 25 psi gauge or higher. For this purpose a standard nitrogen tank 68 with a first pressure regulator 70 for providing pressurized nitrogen through line 72 to the top of the reservoir 54 is provided.

There are certain parameters within which it may be necessary to control the system of the present invention. By way of example, the exhaust stack temperatures may range from 550° F. to 900° F. or higher, so that it may be necessary to limit the maximum temperature on the outlet side of the heat exchanger 42 in line 64 to some upper boundary which is below the chemical degradation and/or boiling point of the heat transfer fluid at the established pressure in the flow circuit. Also, products of combustion normally include not only water but other compounds, some of which are extremely corrosive in the liquid form. Typically, such products of cumbustion will remain in the gaseous state in an exhaust stack if the temperature thereof remains in the region of 350° F. or higher, and accordingly it may be desirable in some applications, depending upon the particular requirements, to control the system so that the temperature of the heat transfer fluid in the outlet line 64 from heat exchanger 42 is at least 350° F. To accomplish this control a first temperature sensor 74 is provided in line 64 to provide a first temperature control signal on line 76 to a controller 78. This signal is used as the basic flow control by controlling valve 84, increasing the flow on temperature increases and decreasing the flow on temperature drops.

As a second temperature control parameter it will be noted that in typical applications the inlet air temperature to blower 38 is normally in the range of 30° F. to 70° F. though much colder air may be encountered depending upon the installation and environment. Accordingly it may be desirable to limit the lowest temperature of the heat transfer fluid in line 66, that is, the outlet of heat exchanger 36, and for this purpose a second temperature sensor 80 is provided in line 66 to provide another temperature control signal on line 82 to the controller 78.

In the event the temperature in the outlet line 64 of heat exchanger 42 exceeds predetermined control limits, various types of control may be implemented. The first type of control is provided by an excess heat exchanger 86 which merely dumps excess heat into the environment upon the flow of the heat transfer fluid therethrough. This flow is controlled by a valve 88 operative from a pressure switch 90 in the by-pass line 92. A set of manual valves 94 is also provided so that the flow in the by-pass line 92 may be directly returned to the reservoir 54 without flowing through the excess heat exchanger 86. In the event of a still further temperature rise in line 64, temperature sensor 74 may provide a signal to the controller 78 which may be used to open damper 50 and close damper 52 and/or to open valve 96 coupled to the nitrogen supply 68 through a regulator 98 to inject relatively high pressure nitrogen into line 62, thereby blowing the heat transfer fluid out of the heat exchanger 42 to clean the exchanger prior to its reaching temperatures which would damage the heat transfer fluid. Of course at the same time pump 58 would be turned off and the system otherwise deactivated pending the reestablishment of control.

It is also desirable to maintain the temperature in the outlet of heat exchanger 36 above some predetermined limit, and for this purpose a temperature sensor 80 is provided which may be used to provide a control signal to the valve 84 thereby determining the flow through the heat exchanger which in turn affects the outlet temperature thereof. Such a flow control allows the control of the greatest viscosity of the heat transfer fluid, thereby assuring adequate flow throughout the system by avoiding excessive flow pressure drops. A third temperature sensor 102 is provided in line 60 between the reservoir 54 and pump 58 to indicate the fluid temperature being delivered from the reservoir. This temperature sensor is thus indicative of the reservoir temperature, whether such temperature depends upon flow through the heat exchanger 36, the excess heat exchanger 86, or the by-pass system, and may be used to prevent overheating the pump. Thus, through the various temperature and pressure controls provided, heat transfer fluid flow throughout the system may be controlled by the various valves therein to control the amount of heat recovered, and to maintain the temperatures and pressures in the system within predetermined bounds.

As an additional control feature it should be noted that the reservoir 54 should never become entirely full or empty of heat transfer fluid, whether from overfilling, differential expansion or leakage of the fluid. Accordingly, for visual inspection purposes a gauge glass 104 is provided. In addition, a vertical tube is provided having float switches 106, 108 and 110 therein. Float switch 106 is used to indicate an overfill condition, with switch 108 indicating a low fluid condition and switch 110 indicating a near empty condition. In operation, switches 106 and 110 are used to shut down the system and sound an alarm, while switch 108 is used to provide a visible or audible signal, or both, to indicate the need for replenishing the reservoir. Accordingly the systems of the present invention include pressure, temperature, flow and fluid level controls to maintain operation within predetermined bounds if possible, and to shut down the system and sound an alarm if any one parameter exceeds the predetermined control limit.

Now referring to FIG. 3, an alternate embodiment of the present invention may be seen. This embodiment may be utilized with a plurality of furnaces 110, each having their exhaust ducted to a common exhaust plenum 112 and exhaust stack 114. The structure 30a of this embodiment of the invention is substantially the same as the structure 30 described in detail with respect to FIGS. 1 and 2, though in this case the single heat exchanger 36 of the earlier embodiment actually comprises multiple heat exchangers 36a, each of which is coupled to heat exchange fluid lines 64a and 66a. Valves 116 may be provided in each of the individual lines supplying these heat exchangers, if desired, to provide either manual control of the relative heat transfer fluid flow in each of the heat exchangers, or if desired, automatic flow control may be provided. Thus each of the individual furnaces may have a blower 38a supplying an inlet plenum 34a having the exchangers 36a therein, when there is insufficient draft due to the typically low pressure drop of the combustion air across the heat exchanger. By providing dampers 50a and 52a, and more particularly by closing damper 50a and opening damper 52a, the combined exhaust normally expelled through stack 114 may be redirected through the apparatus 30a of the present invention for the extraction of the heat therein and the return thereof to the stack 114.

The embodiment of FIG. 3 is highly advantageous for furnaces or furnace cabins of the type shown for a number of reasons. First it allows exceptionally good control on the heat recovery, and more particularly in the distribution of the heat added to the inlet air to each burner nest in the furnace, based on temperature sensors in each of the multiple furnace assemblies. This is particularly important, as dampers may be provided in each of the inlet air plenums, which together with control of the fuel flow in each burner nest, will allow for a more uniform temperature distribution across the length of the entire cabin. (The uncontrolled temperature distribution along a cabin tends to vary considerably, with the maximum being in the center and the minimum at the end furnaces.) This structure is also highly advantageous as it allows prefabricating at a remote location, with a minimum of onsite construction and down time required for installation. This particularly is true in those systems wherein the furnace stack does not have sufficient structure to support the weight of a heat exchanger in the stack, and which therefore otherwise would have to be structurally reinforced from the ground up to incorporate a waste heat recovery system utilizing a heat exchanger in the stack. The present invention is further highly advantageous, since any maintenance or repair of the waste heat recovery system, even with respect to the exhaust duct heat exchanger, may be accomplished without requiring the shutdown of the furnace system itself.

Now referring to FIG. 4 a still further alternate embodiment of the present invention may be seen. This embodiment is intended for use with ground level stacks such as stack 120, which typically run just below ground level to a remote vertical stack, schematically shown in the figure. The apparatus of this embodiment 30b is substantially the same as the apparatus 30a of FIG. 3, though it is generally constructed with a horizontal rather than vertical arrangement so that it may be conveniently disposed over the stack 120 and coupled to the stack through inlet and outlet ducts 122 and 124. Also by the utilization of dampers 50b and 52b the stack exhaust flow may be diverted through the apparatus of the present invention, with the recovered waste heat in the heat transfer fluid being delivered through lines 126 and 128 to the heat exchanger in the inlet air plenum 130 for furnace. As in the embodiment of FIGS. 1 and 2, pressure, temperature, flow and fluid level controls are provided in the apparatus 30b so as to provide maximum control and reliability in the operating system and to require minimum installation time.

Figure 5:
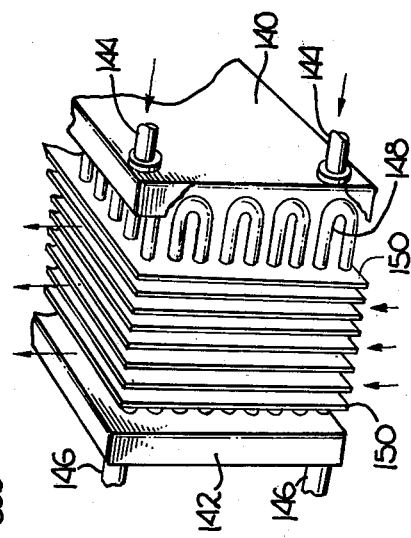
FIG. 5 is a perspective view of heat exchanger which may be used as the exhaust gas heat exchanger in the present invention systems.

Now referring to FIG. 5, a form of heat exchanger which has been found to be particularly useful with the present invention waste heat recovery system may be seen. In prior art systems the heat exchangers have typically been what is referred to as the finned coiled type exchanger, wherein disc like fins are disposed over a tube, such as a copper tube, which is then expanded to retain the fins in the desired position. However, particularly because of the temperatures encountered in exhaust stacks, the heat exchangers schematically represented in FIG. 5 have been found more desirable. In particular, these heat exchangers comprise inlet and outlet manifolds 140 and 142 respectively, with one or more inlets 144 and outlets 146 in communication therewith. A plurality of heat transfer fluid conducting tubes 148 are disposed in a pattern therebetween, with plates 150 pressed over the ends thereof prior to coupling the tubes 148 to the manifolds 140 and 142. Accordingly, flow restriction is minimized, as the heat transfer fluid makes multiple passes, typically at least eight, through the heat exchanger during the heat transfer cycle. This particular construction is also advantages as it allows fabrication of the heat exchangers utilizing steel plates and tubes, since it does not depend upon the expansion of the heat exchanger tubing to retain the fins as in the prior art.

There has been described herein three specific embodiments of the present invention, as well as a unique heat exchanger form particularly advantageous for use with the present invention. The present invention embodies complete waste heat recovery systems, allowing maximum fabrication at a remote location and minimum on site construction to make the systems operative. Further, the systems are so disposed and coupled to the existing furnace systems so as to allow any required servicing of the present invention systems without requiring the shut down of the furnaces. The primary temperature control as illustrated in FIG. 2 is a heat transfer fluid flow control valve 84 operative by a temperature sensor 74 indicative of the outlet temperature for the exhaust stack heat exchanger 42, thereby assuring that the exhaust gas is not cooled below the condensation temperature for the contaminates there. The primary pressure control as illustrated in FIG. 2 is the pressure sensor 90 and bypass valve 88. However, other controls are provided to provide efficient operation and to avoid damage to the system by loss of control for any reason. It should be understood, however, that while three specific embodiments of the present invention have been disclosed and described in detail herein, various changes in design and detail may be made therein without departing from the spirit and scope of the invention.

We claim:

1. An apparatus adapted for coupling to a multiple furnace installation which comprises a plurality of burners, a corresponding plurality of inlet air plenums and a vertically disposed exhaust stack, for recovering the heat energy in waste gases produced in said burner and escaping through said stack, and for delivering said recovered waste heat to inlet air flowing through each of said inlet air plenums, said apparatus comprising:

(a) a vertically disposed, self-supporting, frame structure;

(b) an exhaust gas duct for carrying exhaust gas therethrough, said exhaust gas duct being mounted to an upper portion of said frame structure and being mechanically coupled to and in communication with said stack;

(c) a first heat exchanger means having an inlet and an outlet for receiving and discharging a heat transfer fluid, said first exchanger means being disposed within said exhaust gas duct for absorbing heat from said exhaust gas flowing therethrough;

(d) a plurality of inlet air ducts, corresponding to said plurality of burners and inlet air plenums, for carrying inlet air therethrough, each of said inlet air ducts being mechanically coupled to and in communication with said corresponding inlet air plenum;

(e) a corresponding plurality of second heat exchanger means, each having an inlet and an outlet for receiving and discharging said heat transfer fluid, each of said second exchanger means being disposed within said corresponding inlet air duct for heating the inlet air passing therethrough, the inlet of each of said second heat exchanger means being in communication with the outlet of said first heat exchanger means, and the outlet of each of said second heat exchanger means in communication with the inlet of said first heat exchanger means through conduit means so as to define a flow circuit for said heat transfer fluid;

(f) a reservoir for maintaining a reserve of said heat transfer fluid, said reservoir being mounted on said frame structure and being in communication with said flow circuit; and (g) pumping means for circulating said heat transfer fluid through said flow circuit, said pumping means being mounted on said frame structure and being in communication with said flow circuit, whereby, said apparatus may be brought to the site of said furnace installation, disposed adjacent thereto and inter-coupled to said exhaust stack and to said plurality of inlet air plenums without placing a structural load on said furnace installation.

2. The apparatus of claim 1 wherein at least one of said heat exchanger means comprises:

(i) an inlet manifold in communication with said inlet thereof;

(ii) an outlet manifold in communication with said outlet thereof;

(iii) a plurality of fluid conducting tubes coupled to and in communication with said manifolds, said conducting tubes each providing a multiple pass flow path for said heat transfer fluid; and (iv) a plurality of plates perpendicularly disposed along the length of said conducting tubes, said plates being in contact with said exhaust gas.

3. The apparatus of claim 2 wherein said tubes and plates are made of steel.

4. The apparatus of claim 1 having in addition thereto a limit switch assembly comprising (i) a vertically disposed tube coupled to said reservoir to receive and contain said heat transfer fluid; (ii) first, second and third electrical float switches disposed at first, second and third levels respectively within said tube, said first float switch being adapted to be electrically activated when and if the level of said fluid rises above said first level, said second and third float switches being adapted to be electrically activated when and if the level of said fluid falls below said second and third levels respectively; and (iii) means responsive to the electrical activation of said float switches and being adapted to issue an alarm in response thereto.

5. The apparatus of claim 1 having in addition thereto temperature control means comprising (i) at least two temperature transducers, each located at different points at which the temperature of said heat transfer fluid is critical; (ii) a temperature controller responsive to an out-of-balance condition due to a change in the desired temperature of said fluid at any of said critical points, said temperature controller being mounted to said frame and electrically coupled to said transducers to provide an electrical control signal when said out-of-balance condition is detected; and (iii) a solenoid operated temperature control valve disposed serially in said flow circuit, the position of said valve determining the rate of flow of said heat transfer fluid therein, said solenoid being electrically coupled to the output of said controller so that the position of said valve is controlled by said control signal, whereby said temperature controller, by means of said temperature control valve, adjusts the rate of flow of said fluid so that the temperatures thereof at said critical points are maintained substantially within their desired ranges.

6. The apparatus of claim 1 having in addition thereto a pressure control means comprising (i) a by-pass flow circuit comprising conduit means coupled between the inlet of each of said plurality of second heat exchanger means and said reservoir; (ii) a solenoid-operated pressure control valve disposed serially in said by-pass flow circuit, the position of said valve determining the rate of flow of said heat transfer fluid therein; and (iii) a pressure transducer located at a point within said by-pass flow circuit, said pressure transducer providing an electrical control signal responsive to the pressure detected, said control signal being electrically coupled to said solenoid, whereby, said pressure transducer, by means of said pressure control valve, adjusts the rate of flow of said fluid through said by-pass flow circuit so that the pressure of said fluid is maintained within a predetermined range.

7. The apparatus of claim 6 having in addition thereto a third heat exchanger means mounted to said frame and in valved communication with said by-pass flow circuit, said third heat exchanger means being adapted to release heat from said heat transfer fluid into the environment.

8. The apparatus of claim 1 having in addition thereto a nitrogen gas purge means comprising a nitrogen gas tank coupled to said flow circuit at the inlet side of said first heat exchanger means through a valve means, said valve means enabling the injection of nitrogen gas into said flow circuit in the direction of flow in the event of an interruption in the flow of said heat transfer fluid.

9. The apparatus of claim 1 having in addition thereto a pressurized nitrogen gas source coupled to said reservoir so as to maintain said heat transfer fluid in said flow circuit at a pressure greater than atmospheric, whereby the leakage of air into said flow circuit is avoided and the vapor pressure of said heat transfer fluid is overcome.

10. The apparatus of claim 1 wherein said heat transfer fluid is selected from the group consisting of o-dichlorobenzene, diphenyl-diphenyloxide eutectic, diaryl ethers, tri-aryl ethers, hydrogenated terphenyls, polychlorinated biphenyl and polyphenyl ethers, alkylaromatic petroleum oil, alaphatic petroleum oil and pure lubrication oil.

11. In a system for recovering the heat energy in the waste gases from a multiple burner furnace installation comprising (i) a first heat exchanger means for absorbing heat from said exhaust gas, and having an inlet and an outlet for receiving and discharging a heat transfer fluid; (ii) a reservoir for maintaining a reserve of said heat transfer fluid, said reservoir being in communication with said first heat exchanger means; and (iii) pumping means for circulating said heat transfer fluid through said first heat exchanger means, said pumping means being in communication with said first exchanger means, the improvement comprising:

(a) a vertically disposed, self-supporting, frame structure having affixed thereto at an upper portion thereof an exhaust gas duct for carrying said exhaust gas therethrough, said exhaust gas duct being adapted for coupling to an exhaust stack of said furnace installation and for receiving and supporting said first heat exchanger means therein;

(b) a plurality of inlet air ducts, corresponding in number to said multiple burners, for carrying inlet air therethrough to said multiple burners, each of said inlet air ducts being adapted for coupling to a corresponding inlet air plenum of said furnace installation; and (c) a corresponding plurality of second heat exchanger means having an inlet and an outlet for receiving and discharging said heat transfer fluid, each of said second exchanger means being disposed within said corresponding inlet air duct for heating the inlet air passing therethrough, the inlet of each of said second heat exchanger means being in communication with the outlet of said first heat exchanger means, and the outlet of each of said second heat exchanger means being in communication with the inlet of said first heat exchanger means through conduit means so as to define a flow circuit for said heat transfer fluid, at least one of said plurality of second heat exchanger means comprising (i) an inlet manifold in communication with said inlet thereof; (ii) an outlet manifold in communication with said outlet thereof; (iii) a plurality of fluid conducting tubes coupled to and in communication with said manifolds, said conducting tubes each providing a multiple pass flow path for said heat transfer fluid; and (iv) a plurality of plates perpendicularly disposed along the length of said conducting tubes, said plates being in contact with said exhaust gas, whereby, said system may be brought to the site of said multiple furnace installation, disposed adjacent thereto and inter-coupled to said exhaust stack and to said plurality of inlet air plenums without placing a structural load on said furnace installation.

12. The improvement of claim 11 wherein said exhaust gas duct is coupled to said exhaust stack at upper and lower elevations thereof, said exhaust gas entering said exhaust gas duct at said lower elevation and returning to said exhaust stack at said upper elevation thereof.

13. The improvement of claim 11 wherein said tubes and plates of said second heat exchanger means are made of steel.

14. The improvement of claim 11 having in addition thereto a first blower and a corresponding plurality of second blowers, said first blower being mounted to an upper portion of said frame and being in communication with said exhaust gas duct and said plurality of second blowers being in communication with said corresponding plurality of inlet air ducts.

15. The improvement of claim 11 having in addition thereto a limit switch assembly comprising (i) a vertically disposed tube coupled to said reservoir to receive and contain said heat transfer fluid; (ii) first, second and third electrical float switches disposed at first, second and third levels respectively within said tube, said first float switch being adapted to be electrically activated when and if the level of said fluid rises above said first level, said second and third float switches being adapted to be electrically activated when and if the level of said fluid falls below said second and third levels respectively; and (iii) means responsive to the electrical activation of said float switches and being adapted to issue an alarm in response thereto.

16. The improvement of claim 11 having in addition thereto temperature control means comprising (i) at least two temperature transducers, each located at different points at which the temperature of said heat transfer fluid is critical; (ii) a temperature controller responsive to an out-of-balance condition due to a change in the desired temperature of said fluid at any of said critical points, said temperature controller being mounted to said frame and electrically coupled to said transducers to provide an electrical control signal when said out-of-balance condition is detected; and (iii) a solenoid operated temperature control valve disposed serially in said flow circuit, the position of said valve determining the rate of flow of said heat transfer fluid therein, said solenoid being electrically coupled to the output of said controller so that the position of said valve is controlled by said control signal, whereby said temperature controller, by means of said temperature control valve, adjusts the rate of flow of said fluid so that the temperatures thereof at said critical points are maintained substantially within their desired ranges.

17. The improvement of claim 11 having in addition thereto a pressure control means comprising (i) a by-pass circuit comprising conduit means coupled between the inlet of each of said plurality of second heat exchanger means and said reservoir; (ii) a solenoid-operated pressure control valve disposed serially in said by-pass flow circuit, the position of said valve determining the rate of flow of said heat transfer fluid therein; and (iii) a pressure transducer located at a point within said by-pass flow circuit, said pressure transducer providing an electrical control signal responsive to the pressure detected, said control signal being electrically coupled to said solenoid, whereby, said pressure transducer, by means of said pressure control valve, adjusts the rate of flow of said fluid through said by-pass flow circuit so that the pressure of said fluid is maintained within a predetermined range.

18. The improvement of claim 17 having in addition thereto a third heat exchanger means mounted to said frame and in valved communication with said by-pass flow circuit, said third heat exchanger means being adapted to release heat from said heat transfer fluid into the environment.

19. The improvement of claim 11 having in addition thereto a nitrogen gas purge means comprising a nitrogen gas tank coupled to said flow circuit at the inlet side of said first heat exchanger through a valve means, said valve means enabling the injection of nitrogen gas into said flow circuit in the direction of flow in the event of an interruption in the flow of said heat transfer fluid.

20. The improvement of claim 11 having in addition thereto a pressurized nitrogen gas source coupled to said reservoir so as to maintain said heat transfer fluid in said flow circuit at a pressure greater than atmospheric, whereby the leakage of air into said flow circuit is avoided and the vapor pressure of said heat transfer fluid is overcome.

21. The improvement of claim 11 wherein said heat transfer fluid is selected from the group consisting of o-dichlorobenzene, diphenyl-diphenyloxide eutectic, di-aryl ethers, tri-aryl ethers, hydrogenated terphenyls, polychlorinated biphenyl and polyphenyl ethers, alkyl-aromatic petroleum oil, alaphatic petroleum oil and pure lubrication oil.

22. The improvement of claim 11 having in addition thereto a damper disposed in said exhaust gas duct between said stack and said first heat exchanger, whereby the flow of said exhaust gas past said first heat exchanger may be controlled.

23. The improvement of claim 11 wherein said inlets of said plurality of second heat exchanger means are coupled in parallel by said conduit means and said outlets thereof are coupled in parallel by said conduit means.

24. The improvement of claim 11 having in addition thereto means for controlling the flow of said heat transfer fluid through each of said plurality of second heat exchanger means, said control means being coupled to each of said second heat exchanger means.

* * * * *